United States Patent [19]

Sauer

[11] Patent Number: 4,553,163
[45] Date of Patent: Nov. 12, 1985

[54] INTEGRATED CIRCUIT FOR COLOR TELEVISION RECEIVERS

[75] Inventor: Wolfgang Sauer, Freiburg, Fed. Rep. of Germany

[73] Assignee: ITT Industries, Inc., New York, N.Y.

[21] Appl. No.: 705,864

[22] Filed: Feb. 27, 1985

Related U.S. Application Data

[63] Continuation of Ser. No. 651,647, Sep. 17, 1984, abandoned, which is a continuation of Ser. No. 389,516, Jun. 17, 1982, abandoned.

[30] Foreign Application Priority Data

Jul. 8, 1981 [EP] European Pat. Off. ........ 81105291.9

[51] Int. Cl.$^4$ ............................................. H04N 5/04
[52] U.S. Cl. ..................................... 358/158; 358/159
[58] Field of Search ........................ 358/148, 158, 159

[56] References Cited

U.S. PATENT DOCUMENTS

| | | | |
|---|---|---|---|
| 4,263,615 | 4/1981 | Steinmetz et al. ................... | 358/158 |
| 4,374,366 | 2/1983 | McGinn ............................... | 358/159 |
| 4,385,320 | 5/1983 | Sahara et al. ........................ | 358/159 |

*Primary Examiner*—Richard Murray
*Attorney, Agent, or Firm*—Donald J. Lenkszus

[57] ABSTRACT

This integrated circuit contains the horizontal sweep generator (HO), the amplitude filter (AS), the sync-signal separating circuit (SA) and the frequency/phase comparator (FP). For the purpose of suppressing noise pulses which are caused via the operating voltage during the upper and the lower inversion point of the horizontal sweep generator (HO) which contains a single capacitor (C) and a first threshold stage circuit (SS1) with two fixed thresholds, there are provided a second and a third threshold stage circuit (SS2, SS3), to the inputs of which the sawtooth signal is applied, and with the thresholds thereof, approximately 2 μs prior to reaching the upper or the lower peak value of the sawtooth signal, are being passed through thereby. The output signal of the second threshold circuit (SS2) and the output signal of the third threshold stage circuit (SS3) which is applied via the pulse shaper circuit (IF), are superimposed linearly and, via the stopper circuit (blocking stage) (SP) serve to control the application of the composite video signal (BAS) to the amplitude filter (AS), or else they are applied to a clamping circuit which serves to apply the operating points of the amplitude filter (AS) and/or of the sync-signal separating circuit (SA) to such a potential that these two stages, for the time duration of these output pulses, are prevented from operating.

6 Claims, 1 Drawing Figure

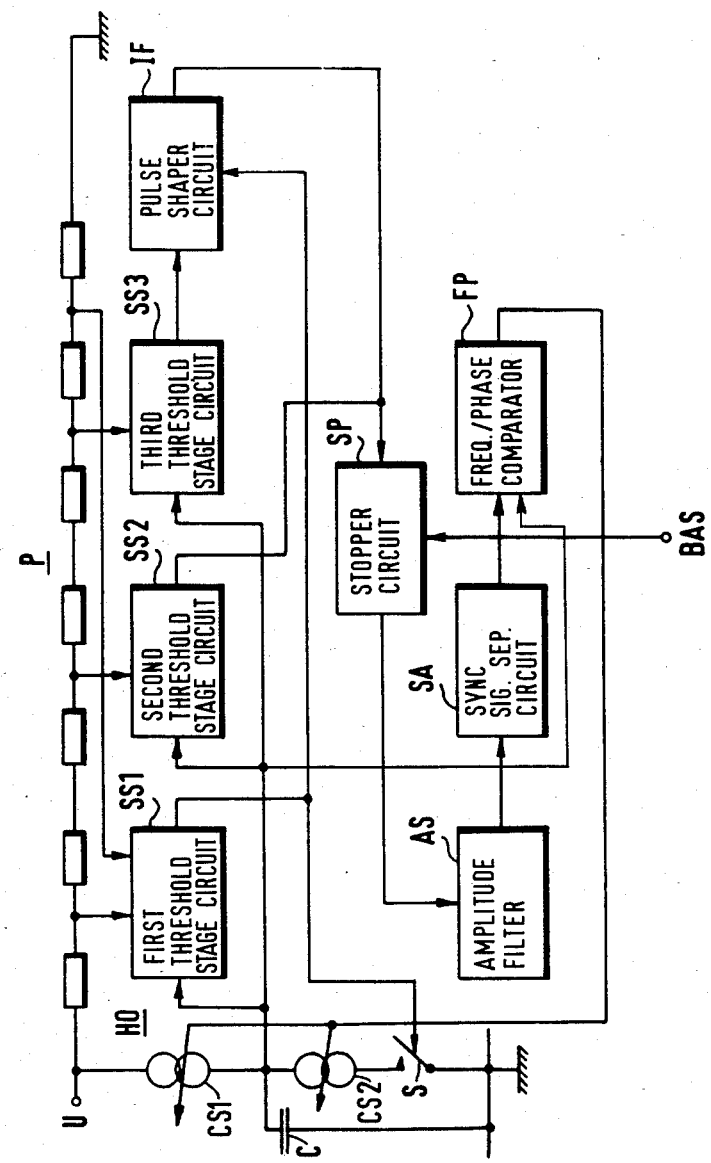

INTEGRATED CIRCUIT FOR COLOR TELEVISION RECEIVERS

This application is a continuation of application Ser. No. 651,647, filed Sept. 17, 1984, which is a continuation of Ser. No. 389,516 filed June 17, 1982, now abandoned.

BACKGROUND OF THE INVENTION

The invention relates to an integrated circuit for (color) television receivers, comprising a voltage- or current-controlled horizontal-sweep generator, an amplitude filter, a synchronizing signal separating circuit (sync-separator) and a frequency/phase comparator which serves to synchronize the horizontal sweep generator which is a sawtooth generator consisting of a single capacitor and of a first threshold stage having two fixed switching thresholds, cf. preamble of the patent claim. Such types of integrated circuits, for example, are known from the technical journal "Elektronik aktuell", 1976, No. 2, pp. 7 to 14 where they are referred to as TDA 9400 and TDA 9500.

Especially on account of the fact that the amplitude filter as well as the horizontal sweep generator in the form of the aforementioned sawtooth generator, are integrated on a single semiconductor body, it is likely that noise interference pulses coming from the individual stages, and via the supply voltage line, may have a disturbing influence upon the horizontal sweep generator, i.e. upon the threshold stage thereof, in such a way that either the lower or the upper or successively both switching thresholds are exceeded before the time by the voltage at the capacitor, owing to the noise superposition, so that the generator will show to have a "wrong" frequency or phase position. This frequency/phase variation, of course, is compensated for by the circuit, with the aid of the synchronzing pulses, but only in such a way that the noise effect remains visible in the television picture.

SUMMARY OF THE INVENTION

The invention is characterized in the claim is aimed at overcoming this drawback by solving the problem of designing an integrated circuit of the type described in greater detail hereinbefore, in such a way that noise pulses acting upon the capacitor voltage or the internal reference voltages for the switching thresholds (see below) in the proximity of the two switching thresholds, are prevented from having the described disadvantageous effect. Accordingly, an advantage of the invention results directly from solving the given problem.

Other objects, features and advantages of the present invention will become more fully apparent from the following detailed description of the preferred embodiment, the appended claims and the accompanying drawing in which:

BRIEF DESCRIPTION OF THE INVENTION

The invention will now be described in greater detail with reference to the accompanying drawing. This drawing, in the form of a schematical circuit diagram, shows the construction of an integrated circuit according to the invention.

DETAILED DESCRIPTION OF THE INVENTION

The horizontal sweep generator HO comprises the capacitor C as connected to the zero point of the circuit, and which is charged and discharged via the two shown constant current sources CS1 and CS2, thus causing the intended sawtooth voltage to appear thereat. Moreover, the horizontal sweep generator HO comprises the first threshold stage circuit SS1, having an upper and a lower threshold. As soon as the capacitor voltage exceeds one of the thresholds, the first threshold stage circuit SS1 switches over to the other threshold. The two thresholds are defined by the voltage divider P as connected to the operating voltage U, and in which the corresponding threshold inputs are connected to corresponding tapping points. The output of the threshold stage circuit SS1 controls the electronic switch S, so that the constant current source CS2 as connected thereto, is either disconnected from or connected to the zero point of the circuit. Accordingly, in the disconnected state, the capacitor C is charged via the constant current source CS1 arranged in series therewith while in the connected state the capacitor C is discharged across the aforementioned constant current source CS2 arranged in parallel therewith, if, as a matter of fact, the current of the constant current source CS1 arranged in series with the capacitor C, is smaller than that of the parallel-arranged constant current source CS2.

Now, for the purpose of avoiding the aforementioned drawbacks, there is provided a second and a third threshold stage circuit SS2 and SS3, respectively, as well as the pulse shaper circuit IF. To the respective input of the two threshold stage circuits SS2, SS3, there is applied the capacitor voltage, in the form of the sawtooth signal, and these stages have a threshold voltage which, approximately 2 $\mu$s prior to the reaching of the upper or the lower peak value of the sawtooth voltage, is being passed thereby. This means to imply that the threshold voltage of the second threshold stage circuit SS2 is somewhat lower than the voltage of the upper threshold of the first threshold stage circuit SS1, and that the threshold voltage of the third threshold stage circuit SS3 is somewhat higher than the voltage of the lower threshold of the first threshold stage circuit SS1. The two thresholds of the threshold stage circuits SS2, SS3 can thus be realized in a simple way by providing further tapping points at the voltage divider P, as is shown in the accompanying drawing. Thus, the second threshold stage circuit SS2 is provided for at a voltage divider tapping point below the tapping point chosen for the upper threshold, and the tapping point for the third threshold stage circuit SS3 is provided for above the tapping point which has been chosen for the lower threshold of the first threshold stage circuit SS1.

Since, within the area of the lower inversion point of the sawtooth signal there results an excessively wide output pulse of the third threshold stage circuit SS3, the pulse shaper circuit IF is arranged subsequently thereto, for reducing the duration of the output pulse as applied to its input, to about the duration of the output pulse of the second threshold stage circuit SS2. This pulse shaper circuit IF, for example, may be realized by a monoflop, in particular by a digital monoflop (=monostable circuit).

The output pulses of the second threshold stage circuit SS2 and of the pulse shaper circuit IF are then super-positioned linearly, with this being denoted in the drawing by a simple interconnection of the two respective lines. The combined signal is applied to the input of the stopper circuit (blocking stage) SP, to the signal input of which there is fed the composite video signal BAS, and the output thereof controls both the amplitude filter AS and the synchronizing signal separating circuit SA.

The combined signal may also be used to control a clamping circuit applying the operating points of the amplitude filter AS and/or of the sync-signal-separating circuit SA to such a potential which prevents it from operating.

If now the sawtooth signal reaches the range of its upper or its lower inversion point, the composite video signal BAS is not applied to either the amplitude filter AS or the sync-signal separating circuit SA, so that shortly before and shortly after the inversion points, signals are prevented from being processed in the two stages AS, SA. This, in turn, has the consequence that during these times noise pulses are prevented from superimposing upon the operating voltage U, so that there is also prevented an unintended triggering of the first threshold stage circuit SS1.

Moreover, it is still shown in the drawing that the amplitude filter AS, the sync-signal separating circuit SA and the frequency/phase comparator FP are arranged in series in terms of signal flow, with the latter, in addition, receiving the sawtooth signal, and with the output signal thereof acting upon the two current sources in a regulating sense. In the drawing, this is indicated by the setting arrows at the two current sources.

While the present invention has been disclosed in connection with the preferred embodiment thereof, it should be understood that there may be other embodiments which fall within the spirit and scope of the invention as defined by the following claims.

I claim:

1. An integrated circuit for color television receivers, comprising a voltage- or current-controlled horizontal sweep generator (HO), an amplitude filter (AS), a synchronizing-signal separating circuit (SA) and a frequency/phase comparator (FP) which serves to synchronize the horizontal sweep generator (HO), with said generator being a sawtooth generator containing a single capacitor (C) and a first threshold stage circuit (SS1) having two fixed thresholds, said integrated circuit further comprising:
   a second and a third threshold stage circuit (SS2, SS3) each being supplied with the sawtooth signal on the input side, comprising each time one threshold which, approximately 2μs prior to the reaching of the upper or the lower peak value of the sawtooth signal, is being passed thereby;
   a pulse shaper circuit (IF) coupled to the output of said third threshold stage circuit (SS3) which pulse shaper circuit reduces the duration of the output pulse thereof to about the duration of the output pulse of said second threshold stage circuit (SS2), and
   a stopper circuit (blocking stage) (SP) coupled to the outputs of both said pulse shaper circuit (IF) and said second threshold stage circuit (SS2), said stopper circuit having a signal input to which there is applied a composite video signal (BAS) and a signal output which is coupled to the input of said amplitude filter (AS).

2. The invention of claim 1 wherein the outputs of both said pulse shaper circuit (IF) and said second threshold stage circuit (SS2) are coupled to a clamping circuit which applies the operating points of said amplitude filter (AS) and said sync-separating signal (SA) to such a potential that they are prevented from operating.

3. An integrated horizontal sweep circuit comprising:
   a generator for generating a sawtooth signal;
   an amplitude filter having an input for receiving a composite video signal and having an output;
   a sync-signal separating circuit having an input coupled to said amplitude filter output and having an output;
   a frequency/phase comparator having a first input coupled to said separating circuit output,
   a second input receiving said sawtooth signal and an output for controlling said generator; and
   a control circuit responsive to said sawtooth signal for inhibiting said composite video signal when said sawtooth signal is within predetermined signal level ranges about the upper and lower inversion points of said sawtooth signal.

4. An integrated circuit in accordance with claim 3 wherein:
   said generator comprises a capacitor, circuit means for charging and discharging said capacitor, and a first threshold circuit controlling said circuit means in response to said sawtooth signal reaching a first level corresponding to said first inversion point and a second level corresponding to said second inversion point.

5. An integrated horizontal sweep circuit comprising:
   a sawtooth signal generator;
   an amplitude filter having an input receiving a composite video signal and having an output;
   a sync-signal separating circuit having an input coupled to said amplitude filter output and having an output;
   a frequency/phase comparator having a first input coupled to said separating circuit output, a second input receiving said sawtooth signal and an output for controlling said generator; and
   a control circuit responsive to said sawtooth signal for inhibiting operation of said amplitude filter and/or said sync-signal separating circuit when said sawtooth signal is within predetermined signal level ranges about the upper and lower inversion point of said sawtooth signal.

6. An integrated circuit in accordance with claim 5 wherein:
   said generator comprises a capacitor, circuit means for charging and discharging said capacitor and a first threshold circuit controlling said circuit means in response to said sawtooth signal reaching a first level corresponding to said first inversion point and a second level corresponding to said second inversion point.

* * * * *